Sept. 11, 1956 C. R. A. JOHNSON 2,762,627

PHONOGRAPH TURNTABLE

Filed March 31, 1951

INVENTOR

CURTIS R. A. JOHNSON

BY

ATTORNEY

United States Patent Office 2,762,627

Patented Sept. 11, 1956

2,762,627

PHONOGRAPH TURNTABLE

Curtis R. A. Johnson, Wyncote, Pa., assignor to Radio Corporation of America, a corporation of Delaware Application March 31, 1951, Serial No. 218,640

4 Claims. (Cl. 274—39)

The present invention relates to phonographs, and more particularly to a turntable for a phonograph which will accommodate disc type phonograph records having different sizes of center hole openings.

Along with the recent development of long playing, low speed, disc-type records, there arises the problem of providing a turntable which is universal in application to the different types of records on the market. With the introduction of the 33⅓ and 45 R. P. M. records, in addition to the well known 78 R. P. M. records, in many cases radio broadcasting studios have heretofore been required to employ two or more turntables which will accommodate these records. In order to provide a single turntable which will accommodate all of these records, two problems arise, namely, (1) a variable speed drive must be provided for the turntable; and (2) a record centering spindle which will accommodate records having different sizes of center hole openings must also be provided.

A primary object of the present invention is to provide an improved turntable for a phonograph which will accommodate records having different sizes of center hole openings.

It is also an object of the present invention to provide a simple, adjustable mechanism for rendering the turntable in condition for playing record dics having different sizes of center hole openings.

Another object of the present invention is to provide, in conjunction with a phonograph turntable, an adjustable record centering spindle which is simple in construction, and positive in operation.

It is also an object of the present invention to provide an improved phonograph turntable and spindle as aforesaid which can be quickly and easily adjusted to accommodate records having different sizes of center hole openings.

Still another object of the present invention is to provide an adjustable record centering spindle which is inexpensive to manufacture, efficient in use, and which readily lends itself to low cost quantity production.

In accordance with the present invention, the improved record centering spindle for a disc record turntable comprises a first spindle for supporting the turntable, and a second spindle of greater diameter than the first spindle. The second, larger spindle is coaxial with and surrounds the first spindle and is movable axially with respect thereto. An opening is provided in the turntable which surrounds the first spindle. The opening is dimensioned to receive the second spindle for disposition in a withdrawn, inoperative position flush with the record supporting section of the turntable. In this position, the turntable is arranged to operate disc records having the smaller of two different sizes of center hole opening. Means are provided for raising the second spindle from the turntable opening to an operative position thereby to adapt the turntable for the accommodation of records having the larger size center hole opening.

The novel features characteristic of the present invention, as well as additional objects and advantages thereof, will be better understood from the following detailed description when read in connection with the accompanying drawing in which.

Figure 1:
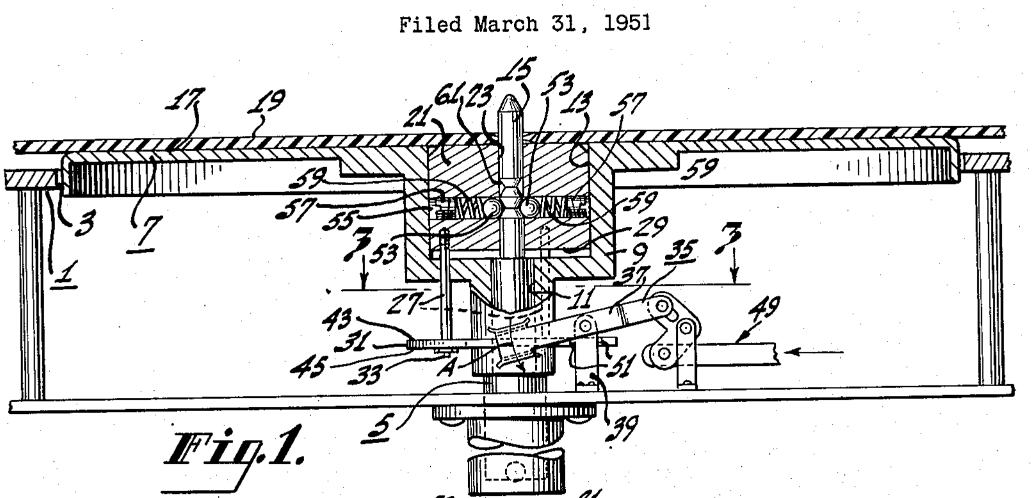
Figure 1 is a side elevation, in section, of a turntable in accordance with the present invention, the parts being shown in position to accommodate a phonograph record having the smaller of two different sizes of center hole opening.

Referring more particularly to the drawing, wherein similar reference characters designate corresponding parts throughout, a motor board or other cabinet partition 1 having an opening 3 therein and a turntable supporting spindle 5 extending vertically through the opening form parts of a conventional type phonograph for disc records and are shown to illustrate the present invention. It is, of course, understood that the spindle 5 may be driven from a motor (not shown) of a suitable kind.

In accordance with a preferred embodiment of the present invention, a record supporting member or platen 7, forming a turntable of conventional design, is provided with a centrally depending hub or boss 9 having two coaxially aligned bores 11, 13. The bores are of different diameters and communicate one with the other. The smaller bore 11 is of a size to slidably receive the supporting spindle 5.

The upper end portion 15 of the supporting spindle 5, that is, the portion of the spindle extending beyond the small bore 11 of the hub, is of a length to extend above the plane of the record supporting surface 17 of the turntable 7. The diameter of the upper spindle portion 15 is of a size to fit the center hole of a conventional 33⅓ or 78 R. P. M. phonograph record 19.

Figure 2:
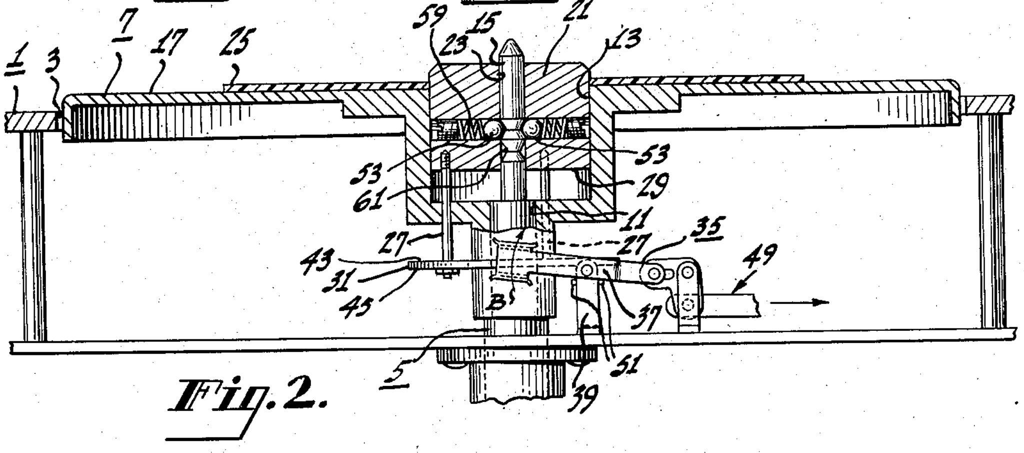
Figure 2 is a view similar to Figure 1, the parts being shown in position to accommodate a phonograph record having the larger of two different sizes of center hole opening.

A second spindle 21 having a diameter larger than that of the turntable supporting spindle 5, is provided with a center hole or bore 23. The second spindle is slidably mounted on the first mentioned spindle for movement in directions axially thereof. The outside diameter of the second spindle is of a size to fit the center hole of a conventional 45 R. P. M. phonograph record 25. The larger, second spindle 21 is mounted within the recess provided by the large bore 13 of the turntable hub 9. The second spindle being slidably mounted on the first spindle is arranged so that it can be moved from an inoperative position within the recess to an operative position partly withdrawn from the recess for receiving records provided with the larger center hole. In its operative withdrawn position, the second spindle extends above the plane of the turntable record supporting surface 17, as shown particularly in Figure 2 of the drawing.

In order to move the second, larger spindle 21 between operative and inoperative positions, suitable mechanical raising and lowering mechanism is provided. In the particular embodiment shown and described herein, a plurality of rods 27 are attached to the lower end 29 of the spindle disposed within the recess. The rods are arranged parallel to, spaced from, and around the small turntable supporting spindle 5. The rods extend downwardly through apertures provided in the hub 9. An annular plate or disc 31 is disposed normal to and around the small spindle 5 and is attached to the lower ends 33 of the rods 27. An actuating lever 35 is provided for engaging the annular disc 31 thereby to raise and lower the large spindle 21. The lever 35 comprises a lever of the first class and is U-shaped in configuration with the arms 37 thereof extending on opposite sides of the small spindle 5. The arms of the lever are pivotally attached to a pair of brackets 39 mounted on the cabinet or framework of the phonograph in a manner to provide a fulcrum for the lever 35.

One end 40 of each of the lever arms has two parallel spaced apart fingers 41 extending laterally therefrom and arranged to engage the upper 43 and lower 45 faces of the annular plate 31. Felt pads 47 are attached to each of the fingers on the sides thereof which engage the plate for the purpose of minimizing noise and effecting a smoother operation. Any suitable arrangement may be provided for operating the lever, such as the mechanical linkage 49, only a portion of which is shown in the drawing.

In operation, when it is desired to play a phonograph record having the smaller of two sizes of center hole, such as the record 19 shown in Figure 1, the lever 35 is moved in the direction of the arrow A. This moves the large spindle 21 into the hub recess thereby permitting the record to be disposed in a playing position on the record supporting surface 17 of the turntable 7. If, however, it is desired to play a record having a larger center hole, such as the record 25 shown in Figure 2, the lever 35 is moved in the direction of the arrow B. In this case, the lever is engaged with the plate 31 to force the large spindle 21 into a raised operation position withdrawn from the recess.

Figure 4:
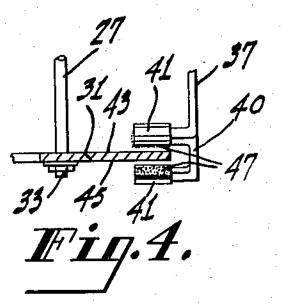
Figure 4 is a side elevation, in section, of a portion of the elevating mechanism shown in Figure 3, taken along the line 4—4 thereof.
Figure 3:
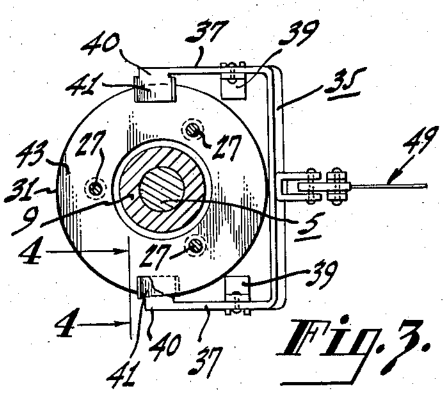
Figure 3 is a plan view, in section, of the elevating mechanism for the large turntable spindle, taken along the line 3—3 of Figure 1.

Inasmuch as the raising and lowering plate 31 and the large spindle 21 rotate simultaneously with the supporting spindle 5, it is necessary to prevent friction as between the actuating lever 35 and the plate. This is accomplished in part, by spacing the fingers 41 of the lever arms apart and providing limiting means, such as the stops 51 on the brackets 39. As shown particularly in Figures 1, 2 and 4, the stops prevent the fingers from touching the plate 31 when it is adjusted to the raised or lowered positions.

In order to effectively lock the large spindle 21 in either of its two adjusted positions, spring-biased ball detents 53 are provided. The ball detents 53 are disposed within radially extending bores 55 provided in the large spindle 21 in a manner such that the detents 53 engage the supporting spindle 5 on opposite sides thereof. Set screws 57 are provided for holding the springs 59 and detents 53 in place. The supporting spindle 5 is provided with two annular grooves 61 in its outer surface. The grooves 61 are arranged in spaced apart relation along the outer surface of the spindle, the spacing of the grooves being such that, when the detents 53 are disposed in the grooves, the large spindle 21 will be effectively locked in its adjusted operative or inoperative positions.

Although, as stated above, the stops 51 limit the movement of the actuating lever 35 in either direction "A" or "B", it will be observed that the raising and lowering plate 31 must still be moved slightly further in order that the plate will be disposed between the lever fingers 41 when the large spindle 21 is disposed in either adjusted position. This is accomplished by spacing the grooves slightly further beyond the intermediate position point at which the lever would normally stop the plate. With this arrangement of the grooves, the lever will move the large spindle as far as limited by the stops, that is, to an intermediate position between the adjusted positions of the large spindle, at which point the detents are then in position to engage the curved surface of the groove toward which the detent is being moved. The biasing force exerted by the spring on the detent will continue movement of the large spindle an amount sufficient to dispose the ball detent in its innermost position within the groove. In this position, the plate 31 will be located in spaced relation to and between the lever fingers and the large spindle will be disposed in its adjusted position.

From the foregoing description, it will be readily apparent that the present invention provides a turntable for phonographs which is universally applicable to records having different sizes of center hole openings. Although there has been shown and described but a single embodiment of the present invention, it will be readily apparent to these persons skilled in the art that various modifications and changes are possible within the spirit of the invention. For example, the mechanical arrangement for raising and lowering the large spindle may be replaced by a solenoid operated device. In another arrangement, the spindle raising and lowering mechanism may be coupled with the motor speed changing mechanism, thereby to help prevent using the improper turntable speed for the particular record being played. Other changes of like character will, no doubt, readily suggest themselves to those skilled in the art. Therefore, it is desired that the particular form of the present invention described herein shall be considered as illustrative and not as limiting.

What is claimed is:

1. In a phonograph having a turntable provided with a centrally disposed opening, a spindle, said spindle including a first record centering portion for records of a smaller diameter center hole, and a second record centering portion of larger diameter than said first portion for records of a larger diameter center hole, said second portion being coaxial with and surrounding said first portion, said second portion being located within and filling said opening to provide a relatively smooth topped platen on the upper surface of the turntable, said second portion being manually movable upwardly with respect to said first portion and elevated above said platen to center records having center hole openings of the larger size on said turntable, and cooperating detent means on said first and second record centering portions for releasably retaining said second portion in said elevated position.

2. In a phonograph record turntable having a central opening, a record centering device for said turntable comprising a first spindle for records of a smaller size center hole extending axially through said opening and a second spindle of greater diameter than said first spindle for records of a larger size center hole having a first position elevated above the surface of said turntable thereby selectively to center records having center hole openings of the larger size on said turntable, said second spindle being coaxial with and surrounding said first spindle and being manually movable downwardly with respect to said first spindle to a second position within and filling said opening to provide a relatively smooth topped platen on the upper surface of said turntable, and manually releasable holding means having at least a portion thereof extending into a recess in said second spindle for releasably engaging and retaining said second spindle in said second position.

3. In a phonograph having a turntable provided with a centrally disposed opening, a spindle, said spindle including a first record centering portion for records of a smaller diameter center hole, a second record centering portion of larger diameter than said first portion for records of a larger diameter center hole, said second portion being coaxial with and surrounding said first portion, said second portion being located within and filling said opening to provide a relatively smooth topped platen on the upper surface of the turntable, said second portion being manully movable upwardly with respect to said first portion and elevated above said platen to center records having center hole openings of the larger size on said turntable, detent means carried by said second centering portion, and grooves on the outer surface of said first centering portion, said grooves being arranged to receive said detent means for effectively locking said second portion in an adjusted position.

4. In a phonograph having a turntable provided with a centrally disposed opening, a spindle, said spindle including a first record centering portion for records of a smaller diameter center hole, and a second record centering portion of larger diameter than said first portion for records of a larger diameter center hole, said second portion being coaxial with and surrounding said first portion, said second portion in a first position thereof being located within and filling said opening to provide a relatively smooth topped platen on the upper surface of the turntable, said second portion being movable upwardly with respect to said first portion and elevated above said platen to center records having center hole openings of the larger size on said turntable, said second portion being manually movable downwardly to said first position for playing records of a smaler diameter center hole, and manually releasable detent holding means on said first and second record centering portions for retaining said second portion in said first position.

References Cited in the file of this patent

UNITED STATES PATENTS

| | | |
|---|---|---|
| 874,985 | O'Neill | Dec. 31, 1907 |
| 1,331,788 | Scherer | Feb. 24, 1920 |
| 1,390,546 | Richmon | Sept. 13, 1921 |
| 1,440,276 | Cerveny | Dec. 26, 1922 |
| 2,319,945 | Osborne | May 25, 1943 |
| 2,416,583 | Hortley | Feb. 25, 1947 |
| 2,554,919 | Mullaney | May 29, 1951 |
| 2,577,035 | Reid | Dec. 4, 1951 |
| 2,693,364 | Chalfin | Nov. 2, 1954 |

FOREIGN PATENTS

| | | |
|---|---|---|
| 355,621 | Great Britain | Aug. 27, 1931 |